Nov. 16, 1965  L. B. JOANIS ETAL  3,217,747
HYDRANT VALVE
Filed June 27, 1960  3 Sheets-Sheet 1
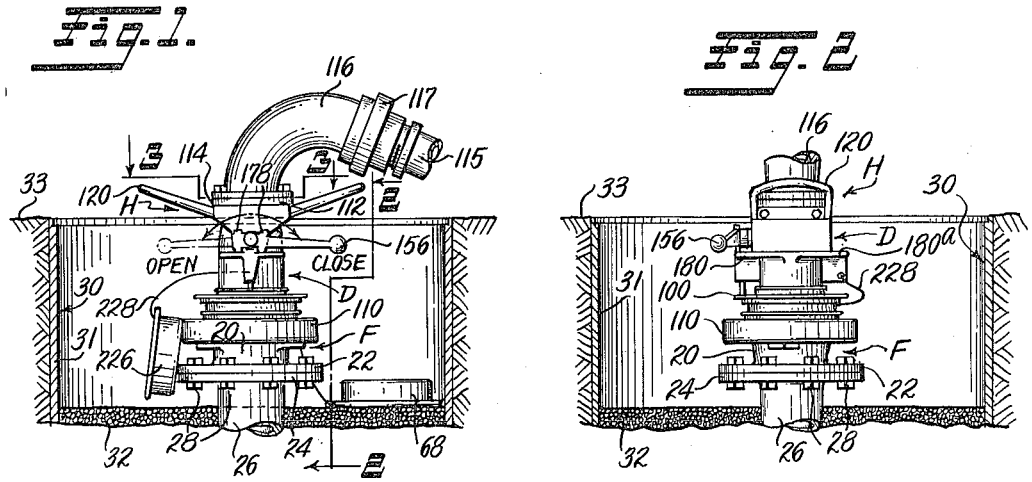
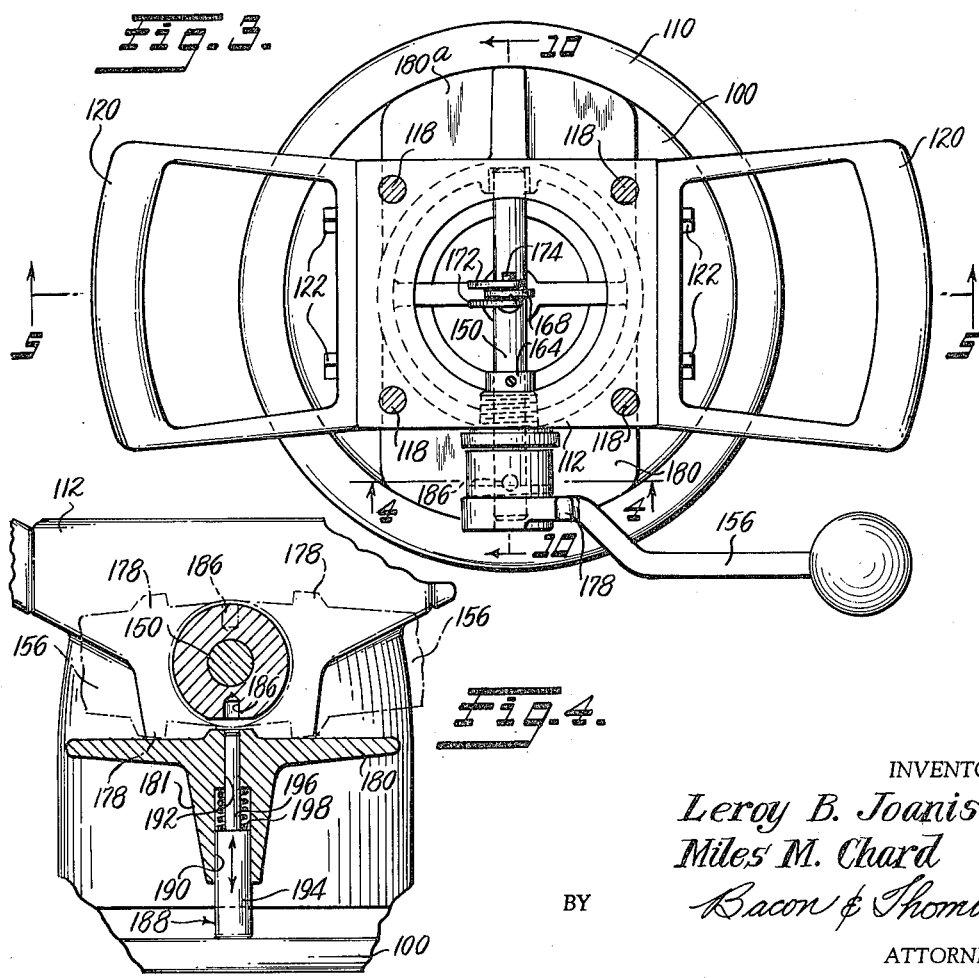
INVENTORS
Leroy B. Joanis
Miles M. Chard
BY Bacon & Thomas
ATTORNEYS Nov. 16, 1965 L. B. JOANIS ETAL 3,217,747
HYDRANT VALVE
Filed June 27, 1960 3 Sheets-Sheet 2
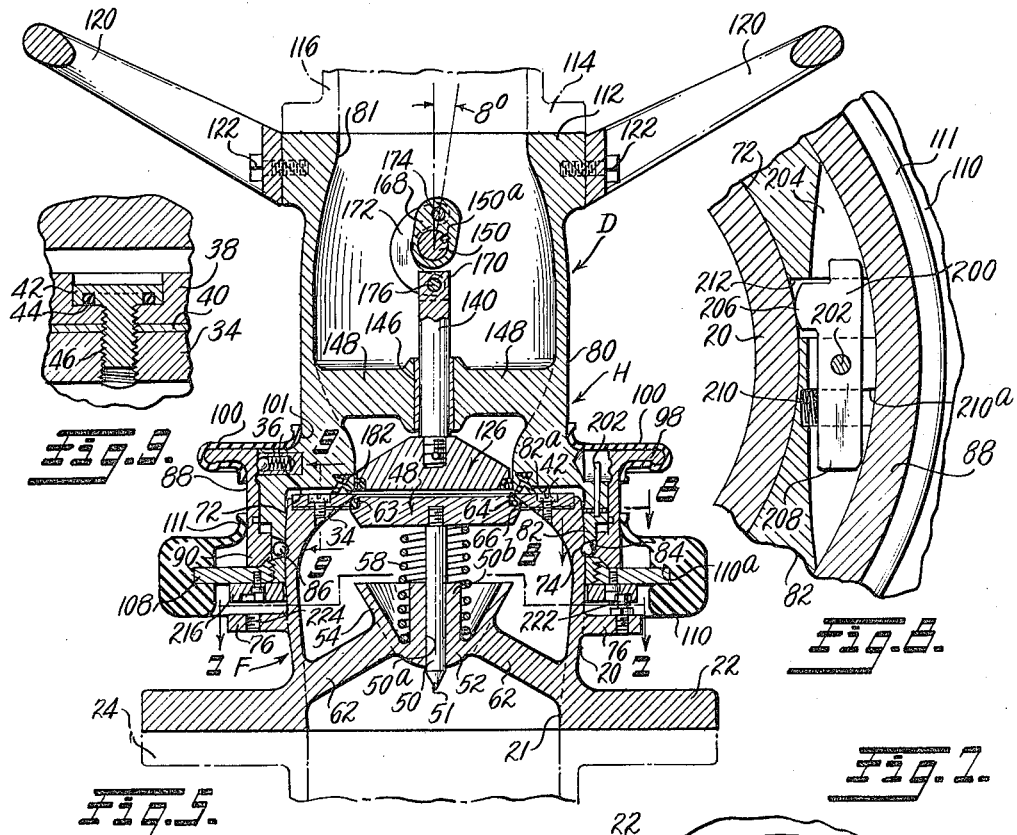
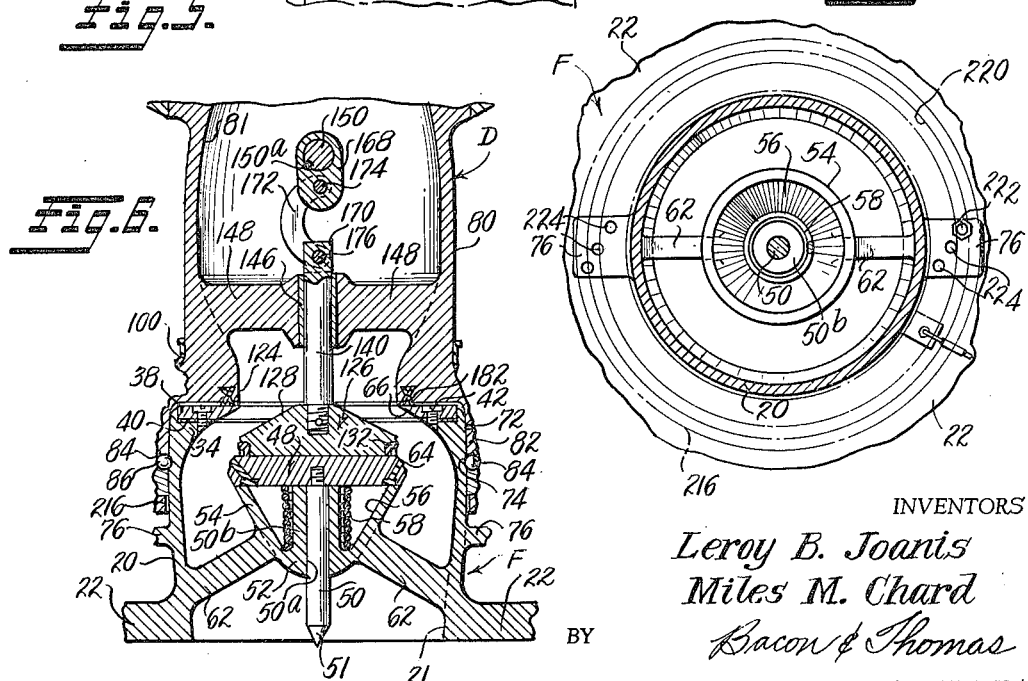
INVENTORS
Leroy B. Joanis
Miles M. Chard
BY Bacon & Thomas
ATTORNEYS

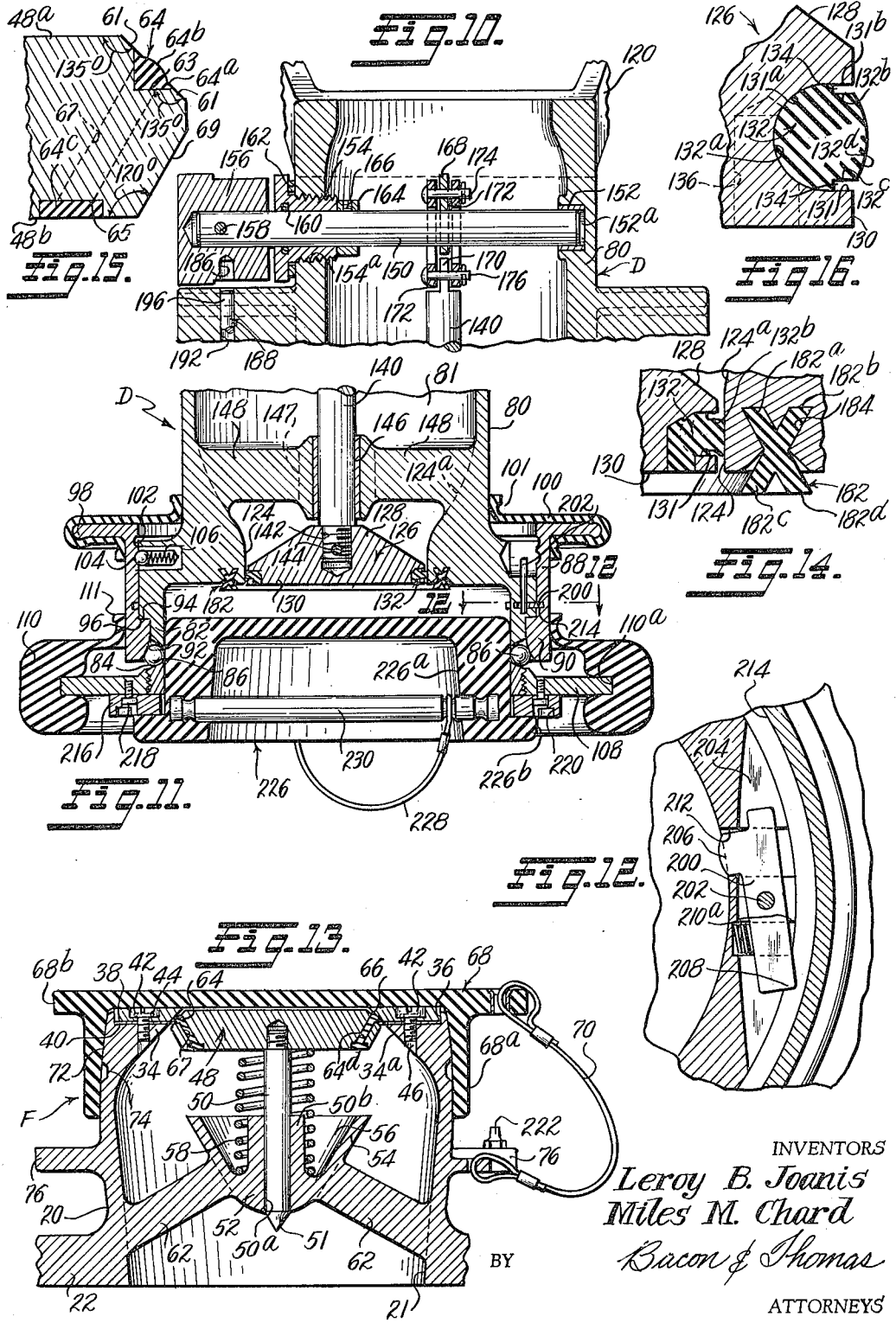

3,217,747
HYDRANT VALVE
Leroy B. Joanis, Anaheim, and Miles M. Chard, Newport Beach, Calif., assignors to Cla-Val Co., Newport Beach, Calif., a corporation of California
Filed June 27, 1960, Ser. No. 39,013
19 Claims. (Cl. 137—614.06)

This invention relates to a hydrant valve unit and more particularly to an improved hydrant valve unit embodying several safety features adapting the same for use in aviation fueling and defueling installations. In such installations, the pipe lines are usually buried underground, as are also the fuel storage tanks and other necessary equipment. These pipe lines normally have terminals located below the surface at various fueling stations at the landing field to avoid above-ground projections. However, the present hydrant valve unit is not limited to use in the particular environment mentioned, but can also be used on barges, tankers, aircraft carriers, tank cars, fuel delivery trucks, etc.

The present hydrant unit consists of two valve structures, each having a valve member for controlling flow therethrough. One of the valve structures is fixed or permanently attached to an end of a fuel pipe and, in the case of an airfield installation, is disposed in a pit with its upper extremity below the ground level so that the pit can have a flush cover, if desired. The other valve structure is detachable from the fixed valve structure and designed to be quickly coupled and locked to the fixed structure valve. The detachable valve structure preferably has a swivel connection with a hose leading to an aircraft or other apparatus for effecting a refueling or defueling operation. The coupling means positively locks the two valve structures together, but permits a full 360° rotation of the detachable valve structure relative to the fixed valve structure. When the detachable valve structure is removed, the upper end of the fixed valve structure is manually covered by a tight-fitting dust cover to prevent contamination. Similarly, when the detachable valve structure is disconnected, its lower end is manually closed by a tight-fitting plug.

The safety design of the fixed and detachable valve structure is such that the detachable valve structure cannot be removed from the fixed valve structure at a time when the valve members therein are in their open position. The valve structures are further designed so that the detachable valve structure cannot be removed from the fixed valve structure unless both valves are fully closed. The valve structures are still further constructed so that, when connected together to form a hydrant, they can be simultaneously opened and closed by the manipulation of a single operating handle. In addition, foolproof cooperating locking means are associated with the fixed and detachable valve structures for positively locking the detachable valve structure to the fixed valve structure so that the two valve structures cannot accidentally come apart. The locking means includes a sleeve or coupling release member whose actuation is controlled by a hydrant operating handle on the detachable valve structure. The arrangement is such that the coupling sleeve cannot be moved to unlock the detachable valve structure from the fixed valve structure, except when the operating handle is in a position corresponding to the closed position of both the fixed valve structure and the detachable valve structure.

A further feature of the present hydrant valve unit is that it includes latch means that locks the coupling sleeve in raised position and also includes locking means actuated by said coupling sleeve that locks the operating handle against rotation when the valve structures are uncoupled, said latch means being releasable only upon bringing the two valve structures together in end-to-end relationship.

A further feature of the present hydrant valve unit is that the fixed and detachable valve structures are provided with indexing means to assure that a given detachable valve structure intended to handle a particular fuel can be mounted only upon a fixed valve structure which handles the identical fuel.

A further feature of the invention is that the valve members in the valve structures are disposed on the end thereof so that they are adjacent one another when the structures are brought into end-to-end relationship. The valve member on the detachable valve structure opens outwardly and the valve member on the fixed valve structure opens inwardly. An operating mechanism is provided for only that valve member which opens outwardly. As the outwardly opening valve member is actuated by its operating mechanism, it engages and opens the inwardly opening valve member. The inwardly opening valve member is constantly urged toward its closing position by line pressure and by a spring engaged at one end by a support within the fixed valve structure. The spring support and the two valve members are streamlined to present a minimum of resistance to fluid flow when the valve members are open. The inner wall surfaces of the valve structures themselves are shaped to provide a Venturi action on the fluid.

The principal object of the invention is to provide a hydrant valve unit that is foolproof and will provide a maximum of safety against the hazards of fuel leakage.

Another object is to provide a hydrant valve unit in which the valve members of the two connecting valve structures are so related that the opening of one valve member causes opening of the other valve member, and the closing of one valve member permits the automatic closing of the other valve member.

Another object is the provision of a novel linkage between a valve member and its actuating means having an overcenter limiting position, when the valve member is closed, to prevent the accidental opening thereof.

Another object is to provide a fixed valve structure for a hydrant valve wherein the valve member thereof is held in closed position by line pressure and is spring-held in closed position under static pressure conditions, when the detachable valve structure is removed therefrom.

Another object is the provision of a novel sealing arrangement for the valve structures, which will seal against line pressure leakage and also seal against the drawing of air into the line should a subatmospheric condition be produced in the line.

Another object is to provide a novel locking and latching means between two valve structures which prevents movement of certain parts from an unlocked position to a locking position unless the structures are in end-to-end relationship.

It is a still further object to provide a universal connection between a fixed hydrant valve structure and a hose and detachable valve structure attached thereto permitting 360° rotation about two axes at right angles to one another.

Another object is to provide a hydrant valve unit including fixed and detachable valve structures which cannot be detached from each other except when the valve members therein are in fully closed position.

Another object is to provide a hydrant valve unit including fixed and detachable valve structures connected together by a quick-release locking coupling, and which coupling can be released only when the valve members in the valve structures are in their fully closed position.

Another object is to provide a hydrant valve unit including a detachable valve structure having an operating handle and a lock releasing pin for said handle arranged so that the operating handle must be actuated to valve closing position before the detachable valve structure can be detached from the remainder of the hydrant valve unit.

Still another object is to provide a hydrant valve unit including an operating handle on a detachable valve structure wherein said handle is locked against movement to valve opening position except when said detachable valve structure is secured to a cooperating fixed valve structure.

Other and further objects and features of the invention will be apparent from the following description taken in conjunction with the accompanying drawings, in which:

FIG. 1 is a front elevational view of the hydrant unit showing the fixed and detachable valve structures connected together, the operating handle being shown in full lines in the position wherein both valves are closed, and being shown in dot-and-dash lines in the position wherein both valves are opened;

FIG. 2 is a side elevational view of the hydrant unit as viewed on line 2—2 of FIG. 1;

FIG. 3 is an enlarged plan view of the hydrant unit taken on line 3—3 of FIG. 1;

FIG. 4 is a fragmentary vertical sectional view of the operating handle and locking pin taken on line 4—4 of FIG. 3;

FIG. 5 is a vertical sectional view through the hydrant unit taken on line 5—5 of FIG. 3, showing both valve elements in closed position;

FIG. 6 is a fragmentary vertical sectional view similar to FIG. 5, but showing the valve elements in open position;

FIG. 7 is a fragmentary horizontal sectional view through the fixed valve structure taken on line 7—7 of FIG. 5;

FIG. 8 is an enlarged fragmentary horizontal sectional view through the hydrant unit taken on line 8—8 of FIG. 5, showing the latch for locking the valve structures together;

FIG. 9 is a fragmentary vertical sectional view through the valve seat and one of the mounting screws of the fixed valve structure taken on line 9—9 of FIG. 5;

FIG. 10 is an enlarged fragmentary vertical sectional view through the operating means for the valve element in the fixed valve structure taken on line 10—10 of FIG. 3;

FIG. 11 is a fragmentary vertical sectional view through the lower end of the detachable valve structure showing the same removed from the fixed valve structure, its valve element in its closed position and its lower end closed by a protective rubber plug or insert frictionally mounted therein;

FIG. 12 is an enlarged horizontal sectional view of the latching mechanism taken on line 12—12 of FIG. 11 and showing the latch in a released position;

FIG. 13 is a fragmentary vertical sectional view through the upper end of the fixed valve structure showing its valve element in its closed position and covered by a protective rubber cap frictionally mounted on said upper end of said structure;

FIG. 14 is an enlarged fragmentary sectional view showing the details of the mounting for the O-ring-like seal in the valve element of the detachable valve structure;

FIG. 15 is a cross-sectional detail view of a portion of the valve and seal of the fixed valve structure of FIG. 13, drawn to a larger scale; and FIG. 16 is a cross-sectional detail view of a portion of the valve and seal of the detachable valve structure of FIG. 11, drawn to a larger scale.

Referring to FIGS. 1, 2 and 5 of the drawings, the hydrant unit is generally identified by the letter H and comprises a fixed valve structure F and a detachable valve structure D. The fixed valve structure includes a valve body 20 having a passageway 21 extending therethrough and a flange 22 on its lower extremity, which is connected to a flange 24 of a fuel pipe 26 by a plurality of bolts 28. The fixed valve structure F is mounted in a pit 30 having a metallic side wall 31 and a bottom 32 composed of a bed of crushed rock or gravel to allow drainage. The pit 30 is deep enough so that the upper end of the valve structure F lies slightly below the ground level 33, permitting the employment of a cover plate, not shown, to close the pit 30 when the valve F is not in use.

The upper end of the valve body 20 includes an inwardly extending flange 34, FIGS. 5 and 13, of gradually increasing thickness. The flange 34 has a recess 36 in which is mounted a ring or valve seat 38, secured in place by countersunk, flatheaded screws 42, threaded into holes 46. A gasket 40 is positioned between the valve seat 38 and the bottom of recess 36. The lower face of the head of the screws 42 has an annular recess containing an O-ring 44, FIG. 9, which prevents leakage of fluid through the threaded holes 46.

A movable valve element 48, FIGS. 5, 6 and 13, having a valve stem 50, is adapted to move inwardly, away from the valve seat 38, to control the flow of fluid through the valve body 20. Valve stem 50 is slidably mounted in an opening 50$^a$ in a combined guide and spring support 52. The opening 50$^a$ is formed in a cylindrical boss 50$^b$ disposed within an inverted cone-shaped formation 54 having a recess 56 therein, the bottom of which serves as an abutment for one end of a helical spring 58 surrounding the boss 50$^b$. The other end of the spring 58 engages the lower face of the valve element 48. The lower end of the valve stem 50 is made pointed as indicated at 51, for a purpose which will be explained later. A pair of supporting arms 62 connect the combined guide and spring support 52 with the wall of the valve body 20.

The upper periphery of the valve element 48, FIG. 15, is grooved at 63 to receive a sealing ring 64, which cooperates with a beveled surface 66 of the valve seat 38, when the valve element is in closed position (FIG. 5), to prevent leakage of fluid through the valve F.

As is shown in FIG. 15, the groove 63 comprises a horizontal wall and a vertical wall, the walls of the groove forming obtuse angles of approximately 135° with the adjacent surface 61 on the valve 48. The surface 61 is disposed on an angle of 45° and forms an angle of 135° with the upper surface 48$^a$ of the valve and is parallel with the surface 66 of the wall of the valve seat 38 (FIG. 13). The sealing ring 64 is generally triangular in radial cross section, the hypotenuse 64$^a$ having end portions flush with the adjacent surface 61 of the valve and a medial, arcuate crown 64$^b$. The particular dimensions of the seal 64 can obviously be varied to suit any installation. In a non-limiting example, used with a 2½-inch hydrant valve, the crown 64$^b$ has a .094″ radius about the inner corner of the groove, and the highest point of the crown is about .015″ above the surface 61.

The sealing ring 64 is preferably applied to the valve 48 by an injection molding process in which the side walls of the groove 63 cooperate with another member, not shown, to form the mold. An annular recess 65 is provided in the bottom wall 48$^b$ of the valve 48 and is connected to the groove 63 by a series of passages 67 (FIG. 13). The resilient sealing material, such as Buna-N rubber, is extruded into the annular recess 65 and through the connecting passages 67 into the groove 63, forming the sealing ring 64, a retaining ring 64$^c$ in the recess 65, and the interconnecting members 64$^d$ in the passages 67. The retaining ring 64$^c$ and the interconnecting members 64$^d$ serve to retain the sealing ring 64 in its groove 63. After molding, the crown 64$^b$ is ground to the desired curvature.

The surface 69 of the valve forms an angle of 120° with the bottom face 48$^b$, and is designed to form an extension of the cone-shaped formation 54 of the combined guide and spring support 52 when the valve 48 is fully opened as shown in FIG. 6, to thereby minimize turbulence during liquid flow through the valve. The surface 66 is beveled on an angle of about 45° and in effect forms a continuation of the inner streamlined surface 34ª defining the flange 34.

A cover 68, FIG. 13, is adapted to be fitted over the upper end of the body 20 of the fixed valve structure F when the detachable valve structure D is not connected thereto, to prevent dust and dirt from being deposited on the seat 38 and valve element 48. The cover 68 also has a skirt 68ª for covering the tapered region 72 and groove 74 therein to prevent contamination thereof. A flexible connector 70 joins the cover with the body portion 20 to prevent misplacing of the cover 68 when not in use. The cover 68 is preferably made of rubber and the skirt 68ª fits airtight over a substantial portion of the valve body 20, as shown in FIG. 13. A projecting rim 68ᵇ aids in applying and removing the cover. One end of the flexible connector 70 is secured to the rim 68ᵇ and the other end is secured to one of a pair of diametrical lugs on the body 20.

The upper end of the valve body 20, as shown in FIGS. 5, 6 and 13, is externally tapered inwardly at 72 to facilitate mounting of the detachable valve structure D and cover 68 thereon. A groove 74 is provided in the tapered region 72 above the diametrically disposed lugs 76, for a purpose described hereinafter.

Referring to FIGS. 5, 6 and 11, the detachable valve structure D comprises a valve body 80 having a passage 81 extending therethrough. The lower end of the body 80 is enlarged to provide a depending cylindrical skirt 82, the inner diameter of which is about equal to the maximum outside diameter of the upper end portion of the body 20 of the fixed valve structure F, so that it snugly fits thereover when the valve structure D is mounted on the valve structure F. The skirt 82 has a plurality of circumferentially spaced, tapered apertures 84 for the reception of latching balls 86. Any suitable number of balls may be used, for example eighteen, in a 2½" valve. A locking sleeve 88 surrounds the skirt 82, and is axially slidable relative thereto. Locking sleeve 88 has a lower inwardly extending flange 90, which is provided with a cam surface 92 adapted to cooperate with the latching balls 86 to retain the fixed and detachable valve structures F and D in connected end-to-end relationship, as will appear hereinafter. The flange 90 has a shoulder 94 adapted to engage a shoulder 96 on the cylindrical skirt 82 to limit the upward movement of the locking sleeve 88, as shown in FIG. 11. The upper end of the locking sleeve 88 has an outwardly projecting flange 98 that can be manually operated by the fingers to raise and lower the locking sleeve 88 on the skirt 82 in a manner explained hereinafter. The flange 98 is preferably protected against damage by a rubber boot 100, which encases the flange and has an inward extension engaging the valve body 80 at 101, to prevent dust and dirt from reaching the interior surfaces of the locking sleeve 88. Near its upper end, the locking sleeve 88 is provided on its interior wall with a pair of axially spaced grooves 102 and 104, which are adapted to cooperate with a pair of diametrically disposed spring-pressed detents 106 carried by the cylindrical skirt 82, to retain the locking sleeve in either its upper (released) or lower (locking) position.

From the foregoing, it is evident that the locking sleeve 88 is placed in position about the depending skirt 82 by slipping the sleeve over the lower end of the skirt after the latching balls 86 and spring-pressed detents 106 have been put in place in the depending skirt. The rubber boot 100 may be placed about the flange 98 after the sleeve 88 is positioned about the valve body 80.

The lower end of skirt 82 is externally threaded to receive a flange ring 108, as shown in FIG. 11. Flange ring 108 serves as a stop to limit the downward movement of sleeve 88, and also to support a thick rubber bumper 110. The bumper 110 is grooved at 110ª to receive the ring 108 and has an inwardly projecting flexible flanged extension 111, having an internal diameter less than the diameter of locking sleeve 88, to resiliently engage the outer side surface of locking sleeve 88, to prevent the passage of dust and dirt to the latching balls 86.

The upper end of valve body 80 is provided with a rectangular flange 112, FIGS. 1, 3 and 8, which engages a flange 114 of a pipe elbow 116. A plurality of cap screws 118 secure the flanges together. A pair of handles 120, on opposite sides of valve body 80, are secured to opposite flat sides of flange 112 by cap screws 122. Elbow 116 is joined to a flexible fuel hose 115 by a swivel connection 117.

The lower end of housing 80 terminates in a cylindrical inlet opening 124, FIG. 11, defined by a streamlined internal wall surface 124ª that converges in the region adjacent said opening. A valve member 126 is movable inwardly into the opening 124 to close the valve F and comprises an upper truncated conical portion 128 and a cylindrical portion 130 forming the base thereof. The peripheral wall of the cylindrical portion 130 is provided with a groove 131 (FIGS. 14 and 16), having a semicircular bottom wall 131ª and parallel, flat, side walls 131ᵇ. A sealing ring 132 is installed in the groove 131 by molding it in place by a process of injection molding. The sealing ring 132 is preferably made of Buna-N rubber and has, in cross section, a semicircular portion 132ª fitting within the semicircular bottom wall 131ª and a generally rectangular portion 132ᵇ forming an annular rib of less axial dimension than the distance between the side walls 131ᵇ, thus providing channels 134 between the sides 132ᶜ of the annular rib 132ᵇ and the walls 131ᵇ of the groove 131. The outer peripheral portion 132ᵈ of the annular rib extends radially beyond the periphery of the cylindrical base 130, and is accurate in contour, as is clearly shown in FIG. 16. The arcuate form can be made by molding, or may be formed by grinding after molding.

As explained above, the sealing ring 132 may be molded in the groove 131, and for this purpose a cooperating mold (not shown) is positioned in proper relation with the groove 131, and the sealing material is injected through a series of passages 136 extending through the base 130 of the valve 126 and communicating with the bottom 131ª of the groove.

The particular size of the sealing ring 132 will, of course, vary in different installations. As an example, however, the following dimensions are typical for a 2½-inch valve: maximum depth of groove 131=.303"; axial width of groove—.185" to .195"; axial width of channel 134=.015" to .018"; radius of curvature of outer periphery 132ᶜ=.150". The peripheral edges of the flat side wall portions of 132ᶜ of the annular rib 132ᵇ have the same diameter as the base 130 of the valve, and the arcuate periphery 132ᵈ extends a maximum of .025" beyond said base.

It will be noted from FIGS. 11 and 14 that the diameter of the base 130 of the valve 126 is slightly smaller than the diameter of the opening 124 in the valve body 80, and that the outer diameter of the sealing ring 132 is slightly larger than the diameter of the opening 124. Hence, when the valve 126 is moved axially into the body 80, the sealing ring 132 will slide along the wall of the opening 124 and the annular rib 132ᵇ will be free to flex laterally or downwardly as diagrammatically illustrated in FIG. 14, causing the sealing ring 132 to be compressed and/or distorted so that the curved surface 132ᵈ becomes flattened to provide a large area in contact with the wall of the opening 124. Such distortion and compression are permitted through the clearance provided by the lower channel 134. Moreover, contact is avoided between the distorted ring and the adjacent corner of the groove 131. The curved portion 132ᵈ avoids any catching of the sealing ring at the juncture of the sides 132ᶜ and the curved portion 132ᵈ of ring 132 on the inner edge of the seat 38 and also on the lower edge of the body opening 124. This feature avoids damage to the sealing ring 132, and greatly prolongs the life of the ring. The inherent resiliency of the material from which the ring 132 is molded assures a fluid-tight seal when the valve 126 is in its closed position.

Upon movement of the valve 126 to open position, the rib 132ᵇ of the sealing ring 132 is free to flex upwardly before sliding along the wall of the opening 124, as will be readily understood.

A valve stem 140 has a lower threaded end that is connected to valve member 126 by threads in a bore 142. A nylon pin 144, having a length greater than the root diameter of the threaded bore 142, passes through a transverse opening in the threaded end of the valve stem 140 to engage the threaded bore 142 to provide an interference fit or lock, to prevent unthreading. Valve stem 140 is slidable in a bearing sleeve 146 carried by a guide 147 integral with a pair of supporting arms 148 extending radially from the interior wall of valve body 80.

Extending transversely across valve body 80, and above valve stem 140, as shown in FIG. 10, is a rotatable shaft 150 supported at its inner end in a bearing 152 mounted in a recess 152ᵃ in the side wall of valve body 80. The other end of the shaft 150 extends through a bearing sleeve 154 threaded into an opening 154ᵃ in the opposite side wall of the valve body 80. The outer end of shaft 150 has an operating handle 156 connected thereto by a pin 158 passing through the handle and shaft. Bearing sleeve 154 carries a sealing ring 160 surrounding shaft 150 to prevent the loss of fluid between the shaft and the bearing, while a gasket 162, placed between a flange 154ᵇ on bearing 154 and the exterior wall surface of valve body 80, prevents the loss of fluid between the bearing and the threaded opening 154ᵃ in the body. A collar 164 surrounds shaft 150 and is secured thereto by a set screw 166, FIG. 3. The collar 164 engages the inner end of bearing 154, and prevents axial displacement of shaft 150.

The valve member 126 is actuatable manually to either open or close the valve D by the handle 156 through a linkage system, which will now be described. Secured to shaft 150 by a key 150ᵃ, FIGS. 5 and 6, and in line with the axis of valve stem 140, as shown in FIG. 10, is a crank arm 168. Portions of the upper end of valve stem 140 are cut away to form a tongue 170. The crank arm 168 is pivotally connected to one end of a pair of arcuate links 172, disposed on opposite sides thereof, by a pin 174. The other end of the links 172 is pivotally connected to the tongue 170 by a pin 176. Thus, the crank arm 168 is operatively connected to the valve stem 140 by the links 172 and pivot pins 174 and 176. Hence, the crank arm 168 oscillates with the shaft 150 so that the axis of pin 174 describes an arc of a circle about the longitudinal axis of shaft 150 when the latter is oscillated by the handle 156.

In designing the linkage system above described, a critical ratio must be maintained between the length of the links 172, as measured from the center of pivot pins 174 and 176, and the length of the crank arm 168, as measured from the center of pivot pin 174 and the center of shaft 150. It has been determined that optimum results are obtained when this ratio is substantially 1.13 to 0.5. That is, for a distance between pins 174 and 176 of 1.13 inches, the distance from pin 174 to the axis of shaft 150 should be 0.5 inch. The particular dimensions given above are exemplary for a 2½" valve and will vary with the size of valve, to provide the required axial movement to cause the valve members 126 and 148 to open sufficiently to allow the maximum unobstructed fluid flow, etc. The dimensions specified will provide an outward opening movement of 1.63 inches for the valve member 126.

It is apparent that if this ratio of 1.13 to 0.5 were changed so that the distance between the pins 174 and 176 of the links were increased without a corresponding increase in the distance between pin 174 and the axis of shaft 150, the pin 174 would swing so far from the longitudinal axis of the shaft 150 and valve stem 140 that much of the pressure exerted by operating handle 156 on the shaft 150 would result in an excessive side force on the valve stem 140, causing excessive wear on said valve stem. If the ratio were changed in the opposite way, that is, if the distance from pin 174 to the center of shaft 150 were decreased without correspondingly decreasing the distance between pins 174 and 176, the travel of valve stem 140 would be greatly decreased, and it would then be necessary to increase the length of both distances, keeping this same altered ratio, to maintain the same travel distance for the valve member 126.

FIG. 5 illustrates the linkage system in the position corresponding to the closed position of both valve members 126 and 48. It will be noted that the pin 174 lies on a radius about 8° overcenter relative to the axis of the valve stem 140. FIG. 6 shows the linkage system in the position corresponding to the open position of both valve members 126 and 48, i.e., the position in which the valve member 126 has forced the valve member 48 inwardly against the force of the spring 58.

With reference to FIGS. 1 and 4, the handle 156 is provided with opposed lugs 178, which cooperate with a pad 180 on valve body 80 to limit manual oscillating movement of operating handle 156 to an angle slightly greater than 180°. When the handle 156 is in the full-line position shown in FIGS. 1 and 3, the valve member 126 is in its closed position as shown in FIG. 5. The center of the pin 174 is then "overcenter" or slightly to the right of a vertical plane passing through the axis of operating shaft 150. In other words, in moving the handle 156 from its dot-and-dash line position in FIG. 1, or from its "valve-open" position, as shown in FIG. 6, to its "valve-closed" position, as shown in FIG. 5, the shaft 150 is oscillated clockwise about 188°, so that the line joining the axes of pin 174 and shaft 150 forms about an 8° angle with reference to a line passing through the axis of valve stem 140. This overcenter relationship tends to retain the valve member 126 closed against the opening action of the fluid trapped in the detachable valve structure D and the fuel hose coupled thereto, preventing all accidental openings of the valve member.

Referring to FIG. 14, a sealing ring 182, having a cross-section in the form of the letter X, is retained in a groove 184 cut in the face of an annular shoulder 82ᵃ surrounding the valve opening 124 within the skirt 82. The groove 184 is generally complementary to the sealing ring 182 in that it snugly receives the upper legs 182ᵃ and 182ᵇ of the X; whereas, the walls at the mouth of said groove diverge on a greater angle than the lower legs 182ᶜ and 182ᵈ of the X. The sealing ring 182 is preferably made of some suitable elastic material such as Buna N, which is resistant to gasoline and other fuels, and is easily removable and replaceable. The lower legs 182ᶜ and 182ᵈ of the sealing ring 182, as shown in FIGS. 6 and 9, are free to spread apart like flaps and engage the upper surface of the ring or valve seat 38 of the fixed valve body 20, in surrounding relation to the valve member 26, when the valve structures D and F are joined, to prevent leakage at the junction when the valve structures are open, as shown in FIG. 6. Thus, the inner lower leg 182ᶜ is pressed against the seat 38 by line pressure to form a seal against leakage from within the valve, and the lower outer leg 182ᵈ is pressed against the seat 38 by atmospheric pressure and will prevent air from entering the valve in the event that a vacuum condition is created in the valve.

The valve operating handle 156, on the end thereof which is attached to the operating shaft 150 (FIGS. 4 and 10, is provided with a recess 186 extending radially of the shaft opening therein. The recess 186 lies below valve operating shaft 150 when the valve members 48 and 126 are closed, as shown in FIG. 5 and the operating handle 156 is in the corresponding closed position, as shown in FIGS. 4 and 10. A stop member or locking plunger 188, FIGS. 4 and 10, is slidable through the pad 180 to cooperate with the operating handle 156 to lock it in the closed position thereof. For this purpose, a bore 192 in a boss 181 at the lower side of the pad 180 is provided with a vertical counterbore 190, which connects with the bore 192 that extends to the top surface of the pad 180. The stop member 188 constitutes a stepped plunger having a lower large diameter portion 194 receivable in counterbore 190, and a relatively small diameter portion 196, which passes through the bore 192 in line with the recess 186 in operating handle 156. A spring 198 is disposed between the bottom of counterbore 190 and a shoulder formed by the upper end of portion 194 of stop member 188. The spring 198 continuously urges stop member 188 in a downward direction toward the boot 100 on flange 98, as shown in FIG. 4. The valve body 80 has a second pad 180ᵃ, FIGS. 2 and 3, similar to the pad 180 located on the side thereof diametrically opposite the pad 180. The pads 180 and 180ᵃ are located at a convenient distance above the flange 98 of the locking sleeve 88 so that the palms of the hands can rest on the pads while the fingers engage the lower face of the boot 100 to apply a squeezing or upward force on the flange 98 to raise the locking sleeve 88 until its shoulder 94 engages the shoulder 96 on the skirt 82 and the ball detents 106 are received in the groove 104, as shown in FIG. 11. Raising the locking ring as described above will release the latching balls 86 from the groove 74 in the fixed valve structure F (see FIG. 5) and permit the valve structure D to be removed therefrom. However, the locking ring 88 cannot be raised unless the handle 156 is in its closed position permitting the locking plunger 188 to enter the recess 186 in the hub of said handle. On the other hand, with the recess 186 and locking plunger aligned, the locking ring 88 can be raised and the ball detents 106 will lock it in such position and the locking plunger will then hold the handle 156 locked in its closed position.

One of the safety features of the invention resides in providing latch means for assuring that the locking plunger 188 will remain engaged with the handle 156 to prevent turning thereof to open the valve D when the valve D is detached from the valve F. Referring to FIGS. 5, 7, 8, 11 and 12, a latch 200 is pivotally mounted by a pin 202 within a slot 204 extending as a chord in the outer wall portion of the skirt 82. The latch 200 has a laterally extending nose 206 on one side of the pivot pin 202, and a latching end or corner 208 on the opposite side. A spring 210 is mounted in the bottom of a recess 210ᵃ and resiliently urges latch 200 in a counterclockwise direction, as reviewed in FIG. 12. The skirt 82 is provided with an opening 212, aligned with the nose 206 of the latch 200, to permit the nose 206 to extend therethrough and beyond the inner surface of the skirt 82, as shown in FIGS. 11 and 12. The inner wall surface of locking sleeve 88, slightly above flange 90, has a groove 214 therein, adapted to be horizontally aligned with the latch 200 to positively lock sleeve 88 relative to the skirt 82 when said sleeve is in its raised or non-locking position on valve F, as shown in FIG. 11.

An indexing ring 216, FIGS. 5 and 11, is secured to the lower surface of flange ring 108 by a plurality of flat headed screws 218. Indexing ring 216 is provided, in the lower surface thereof, with an annular groove 220 having a predetermined radius and width (FIG. 7). A cooperating indexing pin 222 has its lower end threaded to be mounted in a selected one of a plurality of threaded bores 224 in the opposed lugs 76. It will be noted, with reference to FIG. 5, that the indexing ring 216 is carried at the lower end of the detachable valve structure D, and that the groove 220 therein must align with the upper end of indexing pin 222 in order to bring the valve structures D and F into proper coupling relation. In order to avoid the undesirable coupling of a detachable valve structure D used for handling one type of fuel to a fixed valve structure F handling a different type of fuel, the indexing ring 216 mounted on a detachable valve structure D intended for a certain type of fuel must have a groove 220 therein with a diameter engageable with an indexing pin 222 as located in the lugs 76 of a fixed valve structure F which carries the same type of fuel. The indexing ring 216 is replaceable by other rings having grooves 220 of different diameters. For example, and referring to FIG. 7, it will be noted that each projecting lug 76 has three threaded bores 224 at different radii or distances from the center of the valve structure, and that it is therefore possible to place an indexing pin 222 in any one of the six threaded bores. Likewise, different indexing rings 216 each having an annular groove 220 of different diameter may be used on detachable valve structures intended for different fuels. It is important, therefore, that a particular detachable valve structure should be coupled only with a particular fixed valve structure intended for the same type of fuel. An indexing ring 216, having a certain diameter groove 220 therein is selected, and an indexing pin 222 is placed in the corresponding threaded bore 224 in one of the lugs 76 to register with said groove when the valve structures D and F are brought into proper aligned end-to-end relationship.

A closure plug 226 (FIG. 11) is adapted to be placed into the open end of the skirt 82 of the detachable valve structure D when said structure is disconnected from the fixed valve structure F, in order to keep out dust and dirt. The plug 226 has a large cavity 226ᵃ extending inwardly from its outer face, and a projecting rim 226ᵇ that engages the lower face of the indexing ring 216. A bar or hand grip 230 is molded in the plug 226 and extends diametrically across the cavity 226ᵃ. It will be noted from FIG. 11 that the plug 226 does not extend far enough into the skirt 82 to engage the nose 206 of latch 200. A flexible member 228 is connected at one end thereof to the hand grip 230 and its other end is connected with the pad 180ᵃ of the detachable valve body 80, as shown in FIGS. 1 and 2, to prevent loss or misplacing of the plug 226 when not in use.

FIG. 11 illustrates the lower or coupling end of the detachable valve structure D, closed by plug 226, and FIG. 13 illustrates the upper end of the fixed valve structure F enclosed by the cover 68, as is desirable when said valve structures are disconnected. It should be noted, with reference to FIG. 11, that the locking sleeve 88 is in its raised position with the shoulders 94 and 96 in contact, being retained in this position by the spring-pressed detents 106 which then engage the lower annular groove 104. In this position of the locking sleeve 88, the cam surface 92 of the flange 90 permits the latching balls 86 to roll outwardly by gravity in their tapered apertures 84. Also in this position of the locking sleeve 88, locking plunger 188 has been forced upwardly by the boot covering flange 98 against the action of its spring 198, forcing the portion 196 thereof into recess 186 of handle 156, thereby locking the operating handle 156 in the position in which the valve member 126 is closed. It will be understood that in use the detachable valve structure D and the flexible fueling hose 115 connected thereto are filled with fluid, and the locking engagement of portion 196 in recess 186, together with the overcenter position of crank arm 168, as shown in FIG. 5, assures that the valve member 126 cannot be deliberately opened and will not be opened if the detachable valve structure D is accidentally dropped.

Referring to FIG. 13, valve member 48 is retained against its valve seat 38 by the joint action of spring 58 and the fluid pressure in the fuel pipe line 26.

In order to couple the two valve structures D and F together, the cover 68 and plug 226 are first removed. The detachable valve structure D can then be grasped by the handles 120 and maneuvered into position so that the cylindrical depending skirt 82 thereof is brought into position around the upper tapered end 72 of the fixed valve structure F, as shown in FIG. 5. The tapered end of the fixed valve structure F facilitates assembly, and as the skirt 82 is moved downwardly said tapered end engages the nose 206 of latch 200, as shown in FIG. 8, causing said latch to turn in a clockwise direction about pin 202, thereby moving corner 208 thereof out of latching engagement with the groove 214 and automatically releasing locking sleeve 88. Assuming that the detachable valve structure D is carrying an indexing ring 216 having a groove 220 in alignment with the indexing pin 222 for the particular fuel to be dispensed, the detachable valve structure D can be brought downward about the upper end of the valve structure F until the lower legs of the sealing ring 182 are compressed by abutment against the seat 38, as shown in FIGS. 5 and 6. In this position, the latching balls 86 in the skirt 82 are aligned with the groove 74 in the upper end of the fixed valve structure F. By applying manual pressure to the flange 98, the locking sleeve 88 will be moved downwardly from the position shown in FIG. 11 to the position shown in FIG. 5. Such movement produces a camming action by the cam surface 92 on the latching balls 86, forcing the balls inwardly into the annular groove 74, as shown in FIG. 5. Downward movement of the locking sleeve 88 is limited by engagement of the lower end thereof with the upper surface of flange ring 108. In such position, the detents 106 engage the upper groove 102 in the locking sleeve 88 to retain the sleeve in its lower, or locking, position, securing the valve structures D and F together by holding the latching balls 86 in locking position. When the locking sleeve 88 has been moved downwardly, as described above, spring 198 forces the locking plunger 188 to follow the downward movement of the locking sleeve to effect retraction of the portion 196 of said plunger from the recess 186 in operating handle 156. The valve structures D and F are now securely joined together, and the operating handle 156 is now unlocked and can be operated to open both valves. The projecting legs 182ᶜ and 182ᵈ of the sealing ring X are spread by being forced against the valve seat 38, preventing leakage at the joint, as aforedescribed.

In order to actuate the valve members 126 and 48 to their open position, operating handle 156 is swung counterclockwise, as viewed in FIG. 1, from the closed position shown in full lines to the open position shown in dot-and-dash lines. This movement extends over an angle slightly greater than 180°, producing a corresponding counterclockwise rotation of shaft 150 from the position shown in FIG. 5 to the position shown in FIG. 6. This rotation of shaft 150 actuates crank arm 168 and connecting links 172 to produce a downward movement of valve stem 140 and valve member 126 attached thereto. Valve member 126, after a slight downward movement from the position shown in FIG. 5, contacts the upper surface of valve member 48, and thereafter both valve members move downwardly as a unit against the force of spring 58 and the pressure of fluid in pipe line 26. The parts are so designed that the valve members 126 and 48 are fully opened when the crank pin 174 is below the shaft 150 and the axis thereof lies in the same plane as the axis of pin 174 and shaft 150, as shown in FIG. 6. It will be noted that in this position, the lower surface of valve member 48 engages the upper surface of the upper end of the inverted cone-shape portion 54 and the upper end of the valve stem guide 50ᵇ. The outer peripheral contour of valve member 48 is such that it forms a continuation of the conical surface of the spring support 52 when the parts are in contact with each other as shown in FIG. 6. Moreover, the contour of the upper surface of the valve member 126 is such that it lies generally parallel with the inclined surface 34ᵃ of the valve body 20 and the beveled surface 66 of the seat 38. Thus, the elements 52, 48 and 126 are streamlined to offer a minimum resistance to the flow of fluid through the hydrant valve unit. The lower end of the valve stem 50 is provided with the conical portion 51 to further promote free flow. The vertical cross section of the fixed valve structure F and the detachable valve structure D, in the region of the valve members 126 and 48 and spring support 52, are designed, in relation to the latter, to provide a flow path of sufficient area to avoid any substantial loss of pressure. The inner walls of the valves D and F are further designed to provide a Venturi action to minimize pressure loss.

In order to uncouple the valve structures D and F, valve operating handle 156 must first be turned clockwise to its closed position. It will be understood that it is impossible to raise locking sleeve 88 from its locked position, shown in FIG. 5, in any position of the operating handle 156 other than its closed position, as the upper portion 196 of locking plunger 188 would then engage an unrecessed portion of operating handle 156 and prevent upward movement of the locking sleeve 88. However, with the valve handle 156 in its valve-closed position, as shown in FIGS. 10 and 11, the recess 186 is vertically aligned with the plunger 188 and the flange 98 of locking sleeve 88 may be grasped and pulled upwardly, as aforedescribed. Operation of the valve handle 156 to this position positively raises the valve 126 to the position shown in FIGS. 5, 11 and 14, in which the valve 126 enters the opening 124, and the spring 58 forces the valve 48 to its closed position. The upward movement of the locking sleeve 88 frees the detents 106 from upper annular groove 102, until the upward movement thereof is arrested by the engagement of shoulders 94 and 96, whereupon the spring-pressed detents 106 will engage the lower groove 104. Cam surface 92 is removed from contact with latching balls 86 simultaneously with the upward movement of sleeve 88, permitting the latching balls 86 to roll outwardly in their apertures 84. A slight upward force on detachable structure F creates a horizontal component on the latching balls to assist them in rolling free if gravity doesn't completely accomplish this. Annular groove 214 is now in horizontal alignment with latch 200, but is not engaged thereby as the latch is retained in its unlatching position, as shown in FIG. 8, by contact of the nose 206 with the tapered surface 72 of valve structure F. Valve structure D may then be removed by lifting on the handles 120, to separate the two valve structures. As the valve structures are separated, spring 210 urges latch 200 in a counterclockwise direction, forcing the corner 208 thereof into latching engagement with annular groove 214, as shown in FIG. 12, to positively lock sleeve 88 in its raised position. The cover 68 and plug 226 may then be replaced.

It should be noted, with reference to FIG. 5, that the indexing means 216-222 permit the detachable valve structure D to be fitted on the fixed valve structure F in any angular position, and that, when joined, the detachable valve structure can be oriented to any angular position through 360° in a horizontal plane. The latching balls 86, riding in the annular groove 74 of the fixed valve structure F, and rolling on the inner surface of flange 90 of the locking sleeve 88, serve as ball bearings to facilitate turning, yet prevent separation. Sealing ring 182 engages the valve seat 38 in all angular positions and prevents loss of fluid. The swivel connection 117 between the elbow 116 and the hose 115 permits the hose, and the nozzle, not shown, connected thereto, to be rotated through an angle of 360° relative to the elbow. In this way, universal movement of the hose 115 relative to the fixed valve F is permitted.

Since the sealing ring 182 is located at the open end of the valve structure D, it is a simple matter to replace the seal when required. The replacement of the sealing rings 64 and 132, on the other hand, require the removal of the valves 48 and 126 and their replacement by other valve members having molded seals thereon, or the removal of the worn seals and the molding of new seals on the removed valves. However, because of the novel construction of the valves and their molded seals, the seals have a very long life.

Having fully described our invention, it is to be understood that we do not wish to be limited to the specific details herein set forth, but that our invention is of the full scope of the appended claims.

We claim:

1. A hydrant valve unit, comprising: a fixed valve structure having one end adapted for attachment to a pipe line; a detachable valve structure having one end adapted for connection to a fueling hose; a separable coupling carried by one of said valve structures, including an element movable axially thereon between latching and unlatching positions, for detachably locking said valve structures together with their other ends abutting in end-to-end relationship; confronting, axially movable valve elements at the abutting ends of said valve structures, one of said valve elements being mounted within each of said valve structures; a valve seat for each valve element carried by its associated valve structure, said valve seats and valve elements being arranged so that, in opening, one valve element moves axially outwardly and the other of said valve elements moves axially inwardly relative to its associated valve structure, and vice versa in closing; operating means structurally independent of said separable coupling mounted on the valve structure carrying said outwardly opening valve element, and including an axially slidable member connected with said outwardly opening valve element and operable independently of said separable coupling to axially move said outwardly opening valve element in either direction, said outwardly opening valve element when moved axially outwardly by said operating means while said abutting ends of said valve structures are detachably locked together engaging the other valve element and forcing said other valve element axially inwardly to an open position, whereby to effect simultaneous opening of both valve elements; means cooperable with said axially movable element and said operating means for locking said operating means against actuation except when said axially movable element is in said latching position, and for locking said axially movable element in its latching position when said operating means has been actuated to open said outwardly opening valve element, said axially movable element when in said unlatching position cooperating with said locking means to positively lock said operating means against actuation; and means operable to retain said axially movable element in said unlatching position to prevent inadvertent displacement thereof, and cooperable with said axially movable element and said locking means when said axially movable element is in said unlatching position to prevent inadvertent opening of said outwardly opening valve element, said retaining means being structurally and operably independent of said separable coupling and of said operating means.

2. A hydrant valve unit as defined in claim 1, in which the outwardly opening valve element, the operating means, the axially movable element and the locking means for said operating means are carried by the detachable valve structure.

3. A hydrant valve unit as defined in claim 1, including resilient means normally urging the inwardly opening valve element in an outward closing direction, whereby said inwardly opening valve element follows the closing, as well as the opening, movement of the outwardly opening valve element.

4. A hydrant valve unit as defined in claim 3, in which the resilient means comprises a spring, and wherein a fixed support contacts one end of the spring and the other end of the spring engages said inwardly opening valve element, said valve elements being in contact and said inwardly opening valve element being in contact with said support when the valves are in their fully open position, the outer surfaces of said valve elements and support exposed to the fluid flow when the valve elements are fully open being of streamlined form to minimize resistance to fluid flow through the valve unit.

5. A hydrant valve unit as defined in claim 1, including resilient means normally urging the inwardly opening valve element in an outward closing direction, and wherein said valves in closing move in the direction of flow of fluid from said fixed into said detachable valve structure, whereby said inwardly opening valve element follows the closing, as well as the opening, movement of the outwardly opening valve element, and wherein the pressure of the fluid assists the resilient means in moving the inwardly opening valve element in an outward direction to close the same.

6. A hydrant valve unit as defined in claim 1, including sealing means carried by one of said valve structures surrounding the valve element therein, said sealing means having portions that sealingly engage a surface surrounding the valve element of the other of said valve structures when said valve structures are joined together.

7. A hydrant valve unit as defined in claim 6, in which a cross-section through said sealing means is generally in the form of the letter X, and in which the valve structure which carries said sealing means is provided with a complemental groove having a cross section in the form of the upper part of the letter X, to effect both a pressure and vacuum seal between the valve structures.

8. A hydrant valve unit, comprising: a fixed valve structure adapted for attachment to a pipe line; a detachable valve structure adapted for connection to a fueling hose; a coupling carried by one of said valve structures detachably joining said valve structures in end-to-end relationship, said coupling comprising latching means to engage said other valve structure in coupling relation; a member, said member being slidably mounted on said one valve structure and being movable axially between two extremities, said movable member comprising a sleeve and having a surface which engages said latching means to lock the valve structures together at one extremity of movement, and which disengages said latching means to unlock the valve structures at the other extremity of movement; a valve element carried by said one valve structure; operating means carried by said one valve structure to open and close said valve element; interlocking means between said sleeve and said valve operating means to lock said valve operating means in the valve element closed-position when said sleeve is at said other extremity of movement, to unlock said valve operating means when said valve is at said one extremity of movement, and to lock said sleeve against moving from said one extremity of movement when said valve operating means is actuated to open said valve element; and means to alternately retain said sleeve at each extremity of its movement to prevent inadvertent displacement thereof, said retaining means being structurally and operably independent of said coupling and including: spring-biased detent means carried on one of said sleeve and said one valve structure, the other of said sleeve and said one valve structure having a pair of axially spaced grooves thereon positioned so that one thereof confronts said detent means to receive the same when said sleeve is at each extremity of its movement.

9. A hydrant valve unit as defined in claim 1, in which the means to operate the valve elements further comprises: an operating shaft, the longitudinal axis of which extends normal to the longitudinal axis of said axially slidable member; a crank arm carried by said operating shaft; a link pivotally connecting said crank arm with said axially slidable member; means to oscillate said operating shaft; and means to limit said oscillation to an angle slightly greater than 180°, whereby said crank, in moving said outwardly opening valve element from one position to another, comes to rest in an over-center position.

10. A hydrant valve unit as defined in claim 1, in which the fixed valve structure comprises a body containing one of the confronting valve elements, said valve body having a passage for the flow of fluid, said passage having an opening at one end and a tapering wall converging toward said opening, said one valve element having a surface parallel to said tapering wall; means mounting said one valve element for axial movement relative to said tapering wall for opening and closing the flow passage, said surface having a groove, said one valve element having passages extending thereinto from the bottom of said groove, and a sealing ring in said groove, said sealing ring including members received within said passages extending from the bottom of said groove to retain the sealing ring in its groove.

11. A hydrant valve unit as defined in claim 1, including additionally: replaceable means on one of said valve structures and adjustable means on the other of said valve structures, said replaceable and adjustable means being cooperable, in all relative angular positions of said valve structures, for preventing other than a given detachable valve structure from being mounted on said fixed valve structure.

12. A hydrant valve as defined in claim 11, in which the replaceable means comprises a member mounted on said one valve structure having an annular groove with side walls of given inner and outer diameters, and the adjustable means comprises a member having an end portion of a dimension slightly less than the radial width of said groove and mounted in an opening in said other valve structure at a point such that said end portion is received in said groove.

13. A hydrant valve as defined in claim 12, in which the fixed valve structure has a plurality of openings located at different radial distances from the axis of said other valve structure adapted to selectively receive said adjustable means to accommodate different replaceable members having annular grooves of correspondingly different diameters.

14. A hydrant valve as defined in claim 11, in which the replaceable means comprises a ring having an annular groove of a given diameter, adapted to surround one end of said one valve structure, and the adjustable means comprises a member having a portion engaging said groove and a portion adapted to be positioned in a predetermined one of a plurality of bores in a lug carried by the other valve structure.

15. A hydrant valve unit as recited in claim 1, wherein said retaining means includes: cooperating spring-pressed detent means on one of said valve structure carrying said outwardly opening valve element and said axially movable element, and axially spaced grooves on the other thereof for receiving said detent means; and a spring-biased latch mechanism on the valve structure carrying said axially movable element and arranged to lock said axially movable element in said unlatching position and to be released by placing said valve structures in end-to-end relationship for coupling.

16. A hydrant valve unit as recited in claim 1, wherein said separable coupling is constructed and arranged to provide for 360° rotation between said valve structures, and including additionally: an elbow fitting on said one end of said detachable valve structure, said elbow fitting including an outer end; a flexible fueling hose; and means connecting said hose to the outer end of said elbow fitting, including a swivel joint to allow 360° rotation of the hose relative to said outer end of said elbow fitting.

17. A hydrant valve unit, comprising: a fixed valve structure adapted for attachment to a pipe line; a detachable valve structure adapted for connection to a fueling hose; a coupling carried by one of said valve structures for detachably joining said valve structures in end-to-end relationship, said coupling including latching means adapted to engage said other valve structure in coupling relation; and a sleeve member movable axially between two extremities, said movable sleeve member having a surface which engages said latching means to lock the valve structures together at one extremity of its movement, and which disengages said latching means to unlock the valve structures at the other extremity of its movement; and means for alternatively retaining said movable sleeve member at either extremity of its movement to prevent inadvertent displacement thereof, said retaining means being structurally and operably independent of said coupling, and including: spring-biased detent means carried on one of said sleeve and said one valve structure, the other of said sleeve and said one valve structure having a pair of axially spaced grooves thereon poistioned so that one thereof confronts said detent means to receive the same when said sleeve is at each extremity of its movement.

18. A hydrant valve unit as defined in claim 17, wherein said retaining means further includes a latch mechanism carried by said one valve structure and a cooperating latch-receiving means in said movable sleeve member, said latch-receiving means and latch mechanism being in alignment when said movable sleeve member is at the extremity thereof at which said latching means is disengaged; resilient means normally urging said latch mechanism to effect latching engagement with said latch-receiving means, said latch mechanism including a projection extending from said one valve structure, when the latch mechanism is in engagement with said latch-receiving means, into the path of movement of said other valve structure when the valve structures are brought together for joining in end-to-end relationship, whereby said projection will be engaged by said other valve structure and be actuated thereby to automatically unlatch said latch mechanism.

19. A hydrant valve unit comprising: a fixed valve structure having one end adapted for attachment to a pipe line; a detachable valve structure having one end adapted for connection to a fueling hose, and comprising a body having a passage defining a flow path for a fluid, said passage including an opening; a separable coupling carried by one of said valve structures including an element movable axially thereon for detachably locking said valve structure together with their other ends in end-to-end relationship; confronting valve elements at the joined ends of said valve structures, one of said valve elements being mounted in each valve structure; a valve seat for each valve element, said valve seats and valve elements being arranged so that, in opening, one valve element moves outwardly and the other valve element moves inwardly relative to its corresponding valve structure, and vice versa in closing; means mounting the valve element contained within said detachable valve structure for movement axially to said opening in the body of said detachable valve structure, said valve element including a peripheral wall having a diameter smaller than that of said opening to permit movement of said valve element in said opening with a clearance, said peripheral wall including a groove having side walls; a sealing ring within said groove, said ring being made of resilient material and having an inner portion of a contour conforming with, and fitting within said groove, said sealing ring having an outer portion of a width less than the width of said groove to provide a clearance between said outer portion of said sealing ring and the side walls of said groove, said sealing ring also having an external diameter greater than the diameter of said opening, whereby the outer portion of said sealing ring, when in contact with said opening, is compressed and/or deformed when said valve element having said groove is in closed position; operating means operable to effect simultaneous opening of both valve elements; and means controlled by said axially movable element and cooperable with said operating means for locking said operating means against actuation except when said valve structures are locked together.

(References on following page)

References Cited by the Examiner

UNITED STATES PATENTS

| | | | |
|---|---|---|---|
| 2,092,116 | 9/1937 | Hansen | 285—315 X |
| 2,257,209 | 9/1941 | Wells | 251—333 X |
| 2,307,546 | 1/1943 | Shimer | 251—333 X |
| 2,457,251 | 12/1948 | Main | 284—19—1 |
| 2,516,947 | 8/1950 | Blevans | 251—315 |
| 2,643,140 | 6/1953 | Scheiwer | 285—193 |
| 2,675,829 | 4/1954 | Livers | 137—614 |
| 2,679,407 | 5/1954 | Badger | 284—18 |
| 2,705,159 | 3/1955 | Pfau | 285—150 |
| 2,729,471 | 1/1956 | Fraser | 137—614.03 X |
| 2,739,827 | 3/1956 | Drone et al. | 137—614.06 |
| 2,770,256 | 11/1956 | Krapp | 137—614 |
| 2,836,207 | 5/1958 | Griswold | 137—614 X |
| 2,904,305 | 9/1959 | Novotny | 251—332 X |
| 2,943,636 | 7/1960 | Reed et al. | 137—614.03 X |
| 2,962,303 | 11/1960 | Ramberg et al. | 137—614 X |
| 3,034,544 | 5/1962 | Griswold | 141—346 |
| 3,113,588 | 12/1963 | Torres | 137—614.06 |

M. CARY NELSON, *Primary Examiner.*

MORRIS M. FRITZ, LAVERNE D. GEIGER,

*Examiners.*